United States Patent [19]
Levitt et al.

[11] 3,888,661
[45] June 10, 1975

[54] PRODUCTION OF GRAPHITE FIBER REINFORCED METAL MATRIX COMPOSITES

[75] Inventors: Albert P. Levitt, Newton Center; Eugene Di Cesare, Wayland, both of Mass.

[73] Assignee: The United States of America as represented by the Secretary of the Army, Washington, D.C.

[22] Filed: Apr. 16, 1974

[21] Appl. No.: 461,318

Related U.S. Application Data

[63] Continuation of Ser. No. 278,129, Aug. 4, 1972, abandoned.

[52] U.S. Cl. ............ 75/201; 29/182.5; 29/192 CP; 75/168 R; 75/226; 423/448; 428/361; 428/367; 428/411; 428/457

[51] Int. Cl.² ... B22F 7/02; B22F 3/14; B32B 15/00; B32B 31/20

[58] Field of Search .......... 75/201, 208 R, 212, 226, 75/214, 168 R, 168 B–168 D, DIG. 1; 29/182.5, 192 CP, 195; 423/447, 448; 161/169, 170, 213, 182

[56] References Cited
UNITED STATES PATENTS

| | | | |
|---|---|---|---|
| 2,945,759 | 7/1960 | Shaw et al. | 75/201 |
| 3,114,197 | 12/1963 | Du Bois et al. | 75/201 X |
| 3,348,967 | 10/1967 | Hucke | 161/170 X |
| 3,384,463 | 5/1968 | Olstowski et al. | 75/168 R |
| 3,432,295 | 3/1969 | Frank et al. | 75/214 |
| 3,443,301 | 5/1969 | Basche et al. | 75/DIG. 1 |
| 3,622,283 | 11/1971 | Sara | 29/195 |
| 3,666,455 | 5/1972 | Olstowski | 75/214 |
| 3,770,488 | 11/1973 | Pepper et al. | 423/448 X |
| 3,781,170 | 12/1973 | Nakao et al. | 75/201 X |
| 3,807,966 | 4/1974 | Butcher et al. | 75/208 R |
| 3,807,996 | 4/1974 | Sara | 75/212 X |
| 3,846,224 | 11/1974 | Leclercq et al. | 161/170 |

Primary Examiner—Harold Ansher
Attorney, Agent, or Firm—Robert P. Gibson; Nathan Edelberg

[57] ABSTRACT

A graphite fiber reinforced metal matrix composite prepared by hot-pressing, comprising layers of a matrix metal selected from the group consisting of magnesium and magnesium based alloys; in combination with alternate layers of a graphite fiber. The improvement consists of small additions of a metal selected from the group consisting of titanium, chromium, nickel, zirconium, hafnium and silicon in order to promote wetting and bonding between the graphite fibers and the matrix metal.

11 Claims, 2 Drawing Figures

PRODUCTION OF GRAPHITE FIBER REINFORCED METAL MATRIX COMPOSITES

The invention described herein may be manufactured, used, and licensed by or for the government for governmental purposes without the payment to us of any royalty thereon.

This is a continuation of application Ser. No. 278,129, filed Aug. 4, 1972, now abandoned.

This invention relates to graphite reinforced metal matrix composites and more particularly to a fiber reinforced metal having improved properties due to wetting and bonding of the graphite material to the metal.

Ordinarily, most metals do not wet ceramics. It has been discovered that small amounts of reactive metals such as titanium, chromium, silicon, zirconium, nickel and hafnium promote wetting and bonding between certain metal matrices, e.g., magnesium and alloying elements thereof, and ceramic fibers such as graphite.

It is an object of the present invention to provide and disclose an improved graphite reinforced metal matrix composite.

It is a further object of the present invention to provide and disclose an improved graphite fiber reinforced metal fabricated by the addition of reactive metals to promote wetting and bonding between the metal matrices and the ceramic fibers.

It is a further object of the present invention to provide and disclose a simple, inexpensive method to fabricate sound, graphite reinforced metal having increased strength.

Other objects and a fuller understanding of the invention may be ascertained from the following description and claims taken in conjunction with the accompanying in which:

Figure 1:
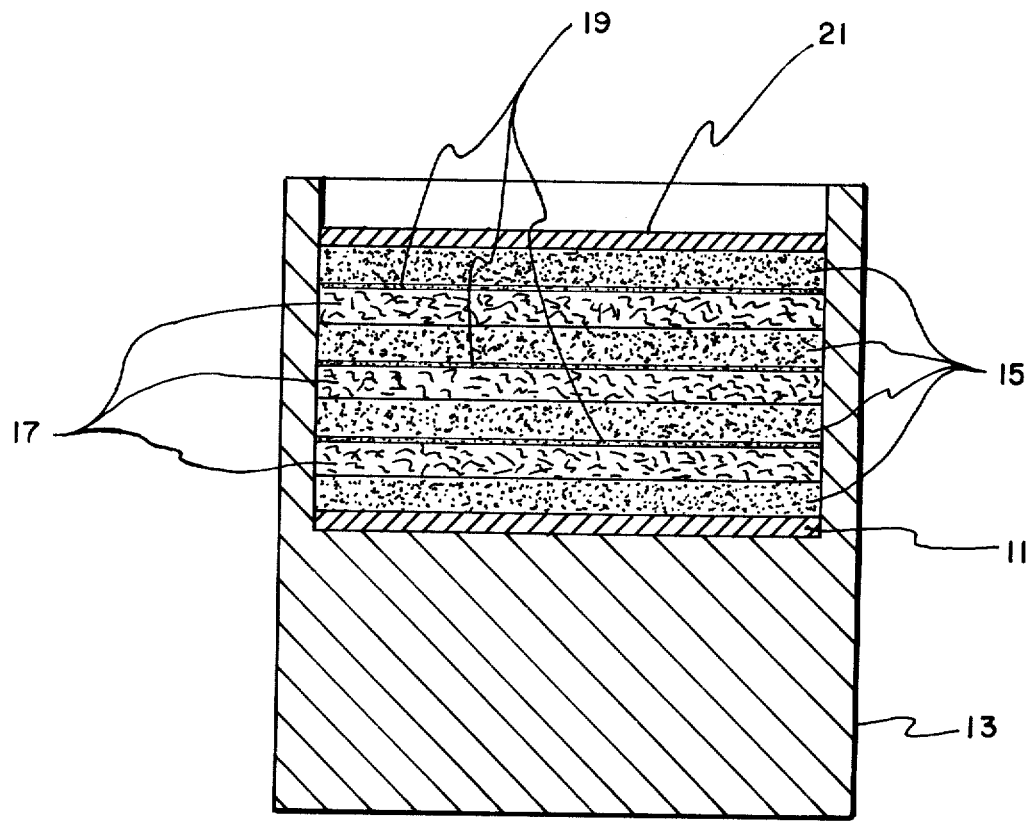
FIG. 1 is a cross-sectional view of layers of a metal powder in combination with alternate layers of graphite fibers positioned in a die prior to hot-pressing.

The present method is carried out by hot-pressing utilizing a die illustrated in FIG. 1, which comprises a rectangular configuration. In operation, steel shim 11 is positioned in the bottom of die 13 in order to facilitate separation of the finished composite from the die and also to provide built in tabs for testing the composite in tension. A layer of magnesium fillings (AZ 91C), designated 15 is followed by graphite fibers 17. Modmor 1 graphite fibers having a length of 38 mm were used. The graphite fibers were then sprinkled or dusted with a small amount of −325 mesh pure titanium powder, designated 19. The amount of titanium utilized depends on the volume fraction of graphite fibers desired. The alternating layers of magnesium powder, graphite fibers and titanium powder were repeated until the die cavity was substantially filled. After the final layer of magnesium fillings were positioned in the die, top shim 21 was positioned thereon and the die was placed in a laboratory press within an induction coil. The die and its contents were then inductively heated to a temperature sufficient to melt the magnesium, e.g., 725°–800°C. After the magnesium melted, about 40 psi pressure was applied and held for a period of about five minutes. The system was then allowed to cool to room temperature. A compact composite article substantially rectangular in configuration was obtained having dimensions 8.9 cm long × 1.25 cm wide × 0.25 cm thick. The composite was then removed from the die, cleaned and machined in final form for testing.

The composition of the fabricated material comprised about 14.4% by volume graphite fibers, 1.84% by weight titanium and the remainder magnesium alloy AZ91C. Magnesium alloy AZ91C comprises about 8.1 to 9.3% aluminum, a minimum of about 0.13% manganese, about 0.4 – 1% zinc and the remainder magnesium. All of the above proportions are on a % by weight basis. In addition to alloy AZ91C and substantially pure magnesium, alloy ZK60A may also be utilized which comprises about 4.8 to 6.2% zinc, a minimum of about 0.45% zirconium and the remainder magnesium.

Set forth in the Table below are a comparison of properties of the present material fabricated as described above, with matrix properties of unreinforced Mg alloy AZ91C.

TABLE

| | Materials | Ultimate Tensile Strength-psi | Elastic Modulus-psi |
|---|---|---|---|
| 1. | unreinforced Mg | 19,500 | 6.1 × 10⁶ |
| 2. | reinforced Mg with Ti addition | 36,775 | 11.9 × 10⁶ |

The present reinforced Mg alloy AZ91C with 1.84% by weight addition of Ti had an increase of 88.5% in Ultimate Tensile Strength and 95.0% in elastic modulus in comparison with unreinforced Mg Alloy AZ91C. It has not been possible to prepare a composite without the Ti additive as wetting and bonding do not take place between the fibers and the matrix metal. Therefore, such properties can not be obtained in a composite without the Ti additive.

The amount of additive reactive material utilized is not critical as long as the amount thereof is sufficient to promote wetting and bonding between the graphite fibers and the matrix metal. Operable ranges include about 14.4 to 40.0% by volume of graphite fibers, a trace to about 4% by weight of Ti and the remainder matrix metal.

Figure 2:
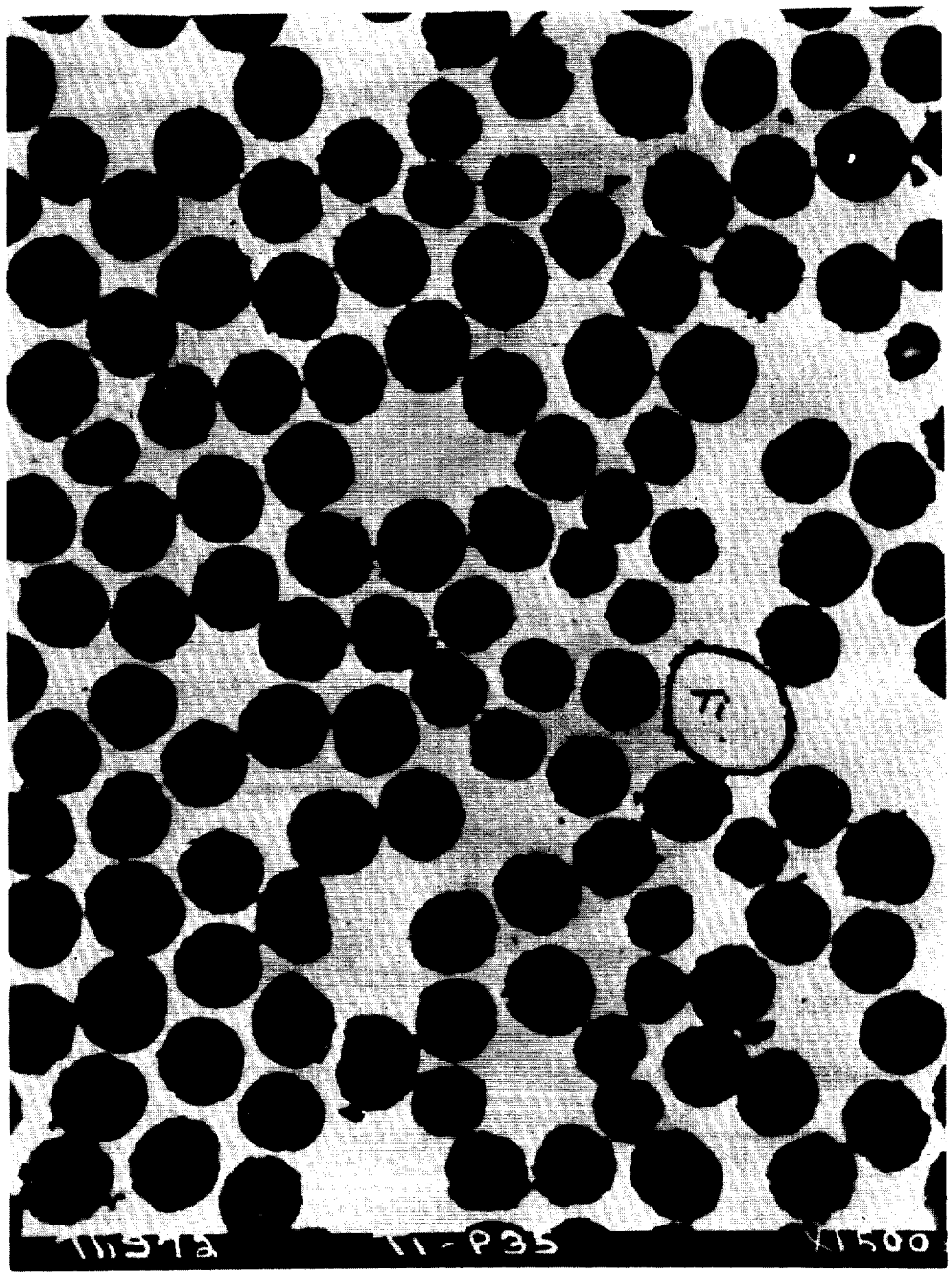
FIG. 2 is a cross sectional photomicrograph of a fabricated reinforced magnesium based alloy.

FIG. 2 is a photomicrograph magnified 1500 times of Mg alloy (AZ91C) reinforced with approximately 40% by volume of Modmor 1 fibers and containing about 1.3% by weight of Ti powder to promote wetting and bonding between the graphite fibers and the matrix metal. The white area surrounding dark circles is Mg alloy matrix. Dark circles are Modmor 1 graphite fibers. A Ti particle is shown as a white area inclosed by a circle.

The present fabricated material has utility in any area where high strength and stiffness is required. A use includes transmission housings for helicopters.

Although we have described our invention with a certain degree of particularity, it is understood that the present disclosure has been made by way of example and that numerous variations may be made without departing from the spirit and the scope of the invention as hereinafter claimed.

Having described our invention, we claim:

1. Method of producing a high strength composite article comprising placing in a hollow hot-press die a plurality of repeating sets of alternating layers of
   A. a matrix metal selected from the group consisting of magnesium powder or magnesium alloy,
   B. graphite fibers, and C. titanium powder as a wetting and bonding agent between said matrix metals and graphite fibers, said titanium powder being present in an effective amount of up to about 4% by weight of said composite article, and hot-pressing said layers at a temperature of about 725°–800°C, said temperature being sufficient to melt only said matrix metal, and at a pressure sufficient to form a compact.

2. Process according to claim 1, wherein said titanium powder is present in an amount of about 1.3 – 1.84% by weight of said composite article.

3. A process in accordance with claim 1 containing about 14.4 to 40.0% by volume of graphite fibers, a trace to about 4.0% by weight of a wetting and bonding agent and the remainder matrix metal.

4. A process in accordance with claim 1 wherein the matrix metal is magnesium.

5. A process in accordance with claim 1, wherein the matrix metal is a magnesium based alloy having alloying elements of about 8.1 – 9.3% aluminum, a minimum of about 0.13% manganese, about 0.4 – 1% zinc and the remainder magnesium, all of the proportions being on a % by weight basis.

6. A process in accordance with claim 1, wherein the matrix metal is a magnesium based alloy having alloying elements of about 4.8 to 6.2% zinc, a minimum of about 0.45% zirconium and the remainder magnesium, all of the proportions being on a % by weight basis.

7. A process in accordance with claim 1 wherein the wetting and bonding agent is zirconium.

8. A process in accordance with claim 1 wherein the wetting and bonding agent is silicon.

9. A process in accordance with claim 1 wherein the wetting and bonding agent is nickel.

10. A process in accordance with claim 1 wherein the wetting and bonding agent is chromium.

11. A process in accordance with claim 1 wherein the wetting and bonding agent is hafnium.

* * * * *